United States Patent
Engel et al.

(10) Patent No.: US 6,926,957 B2
(45) Date of Patent: Aug. 9, 2005

(54) WATER-BASED INK-RECEPTIVE COATING

(75) Inventors: Michael R. Engel, Maplewood, MN (US); William L. Kausch, Cottage Grove, MN (US); Jeffrey A. Peterson, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 264 days.

(21) Appl. No.: 09/896,718

(22) Filed: Jun. 28, 2001

(65) Prior Publication Data

US 2003/0087991 A1 May 8, 2003

(51) Int. Cl.[7] .............................. B32B 5/16; B32B 9/04; B32B 27/18; B32B 27/30
(52) U.S. Cl. .................. 428/327; 428/402.24; 428/195; 428/522; 428/403; 428/407; 428/355 AC; 347/105; 347/106; 525/902; 523/201
(58) Field of Search .......................... 428/327, 402.24, 428/195, 355 AC, 522, 403, 407, 480, 483, 212; 347/105, 106, 1; 525/902; 523/201

(56) References Cited

U.S. PATENT DOCUMENTS

| | | | |
|---|---|---|---|
| 5,141,599 A | * 8/1992 | Jahn et al. | ................... 162/137 |
| 5,310,591 A | 5/1994 | Dodge et al. | |
| 5,310,595 A | 5/1994 | Ali et al. | |
| 5,372,884 A | * 12/1994 | Abe et al. | ................... 428/331 |
| 5,500,457 A | 3/1996 | Sarkar et al. | |
| 5,518,809 A | 5/1996 | Henry et al. | |
| 5,624,747 A | 4/1997 | Sarkar et al. | |
| 5,873,931 A | 2/1999 | Scholz et al. | |
| 5,997,621 A | 12/1999 | Scholz et al. | |
| 6,020,058 A | * 2/2000 | Pekala et al. | ................ 428/327 |
| 6,039,444 A | * 3/2000 | Mori et al. | ................. 347/105 |
| 6,153,288 A | * 11/2000 | Shih et al. | ................... 428/195 |
| 6,436,513 B1 | * 8/2002 | Kitamura et al. | ........... 428/195 |
| 6,450,633 B1 | * 9/2002 | Kronzer | ...................... 347/105 |
| 6,523,950 B1 | * 2/2003 | Lawrence et al. | .......... 347/105 |
| 6,527,387 B2 | * 3/2003 | Lawrence et al. | .......... 347/105 |

FOREIGN PATENT DOCUMENTS

JP        2000-247020       9/2000

* cited by examiner

Primary Examiner—Vivian Chen
(74) Attorney, Agent, or Firm—Carolyn A. Bodes

(57) ABSTRACT

A film receptive to a variety of different classes or kinds of inks, such as water based inks, solvent based inks and UV cured inks. The film includes a water based latex polymer, such as transparent film-forming core/shell latex polymers, a polar polymer, such as polymers having an ionic component to increase the receptivity of the coating to water-based inks, and a surfactant, such as an alkyaryl sulfonate, to prevent agglomeration of the latex polymer before it is formed into film. The preferred latex polymer is a core/shell latex polymer. The preferred polar polymer is chemically compatible with latex polymers and is sufficiently ionic or polar to improve the printability onto the film of water-based inks. The surfactant, which may be in the latex as manufactured or may be added separately, has a molecular structure that includes at least one hydrophobic moiety and at least one anionic group such as sulfates, sulfonates and the like.

6 Claims, 1 Drawing Sheet

WATER-BASED INK-RECEPTIVE COATING

FIELD OF THE INVENTION

The present invention relates to coatings that are receptive to ink printing. More particularly the invention relates to water-based ink-receptive coatings that accept water based inks, solvent based inks and UV-cured inks.

BACKGROUND OF THE INVENTION

There are a number of ink receptive coatings available today for various printing techniques. These include coatings which are selectively receptive to water based, solvent based and/or UV cured inks. However, at the present time there is no coating that is receptive to all three classes of inks to provide a single process for making a universally-printable coated substrate.

For example, labels and other materials are designed to be printed on one side and have a pressure sensitive adhesive on the other side. When the label stock is processed into a final product, one form of ink may be used to apply the company logo and/or address, instructions and other indicia. Another form of ink may be used to apply specific information on an individual label, such as the addressee, delivery instructions and the like. Upon receipt by the addressee, a third indicia is sometimes applied to indicate the time or date of receipt. It is possible that each of the separate incidents of the application of indicia may be done with a different generic type of ink, such as the previously mentioned water-based and solvent-based inks as well as UV cured inks such as UV-Flexographic inks.

Various efforts have been made to use various materials in coating formulations. Commonly owned Dodge et al. U.S. Pat. No. 5,310,591 discloses a transparent image-recording sheet suitable for use in a plain paper copier in which an imageable polymer forms substantially the bulk of the coating, along with a particle component that is necessary for feedability of the plain paper copier image recording sheet. Similar patents are Ali et al. U.S. Pat. No. 5,310,595 and Henry et al. U.S. Pat. No. 5,518,809, also commonly owned.

The use of water based toner receptive core/shell latex compositions has been found to be effective in electrophotographic or xerographic imaging, using a transparent film formed from a core/shell latex polymer and polymeric particles. An antistatic agent is used as well. This system is disclosed in commonly owned Sarkar et al. U.S. Pat. Nos. 5,500,457 and 5,624,747. The particles are needed to impart antifriction characteristics for good feeding.

In printing processes, however, there is a need for a gloss coating that is receptive for inks. Coating glossiness is enhanced if the surface is essentially free of particles, and this also facilitates a smooth transfer of ink to the surface. In addition, it has become desirable to prepare both a gloss side and a matte side of materials on which printing is to be applied, using the various inks as described above. The versatility of a coating that adheres effectively to both sides is an advantage since the coating process can apply an ink receptive coating to both sides of any stock and permit the subsequent use of any kind of ink on either side.

Accordingly it would be of great advantage in the art if a single coating could be provided that would permit water based, solvent based and UV cured inks to adhere to the coating.

It would be another advance in the art if the need for multiple ink receptive coatings for different types of inks could be eliminated.

Another advantage would be to provide an ink receptive coating that could coat substrates for later printing, such that no matter what ink might be selected by the printer at some future time. This coating would permit the coating process to function continuously regardless of the intended end use, and, in fact, without concern for such end use or uses.

Yet another advantage would be to provide a water based coating that eliminates the need for solvent or UV curing capabilities, to permit its use in facilities without those capabilities.

Other advantages will appear hereinafter.

SUMMARY OF THE INVENTION

The present invention provides a film that is receptive to a variety of different classes or kinds of inks, such as water based inks, solvent based inks and UV cured inks such as UV-Flexographic inks. The film is applied to at least one side of a substrate, such as, for example, a polymeric film, to permit printing on the substrate to adhere when one or more kinds of ink are used.

The film of this invention is formed from a water dispersible polymer dispersed in water in an amount sufficient to form a film. The water dispersible polymer needs to be stable as a water dispersion without substantial agglomeration prior to forming said film. The film further has a polar component sufficient to increase the receptivity of said film to printing with water-based ink.

The preferred film of this invention includes (1) a water based latex polymer, such as transparent film-forming core/shell latex polymers, or an aqueous polymer dispersion, such as a water based dispersion of a sulfonated polyester or a polyurethane, and (2) a polar polymer, such as polymers having an ionic or ionizable component, to increase the receptivity of the coating to water-based inks. In some cases, a surfactant, such as an alkylaryl sulfonate may be needed to prevent agglomeration of the latex polymer before it is formed into the film, and in other cases the surfactant used in the manufacture of the latex is sufficient to prevent agglomeration.

The preferred latex polymer is what is known as a core/shell latex polymer wherein the ratio of core to shell ranges from about 10/90 to 90/10, with the core having a lower $T_g$ than the shell. Preferably this latex core/shell polymer has a core formed from about 60 to 100 parts of at least one α,β-ethylenically unsaturated monomer having from about 1 to about 12 carbon atoms and 0 to 40 parts of at least one monomer selected from the group consisting of bicyclic alkyl (meth)acrylates and aromatic (meth)acrylates. The shell is formed from 35 to 100 parts of at least one α,β-ethylenically unsaturated monomer having from about 1 to about 12 carbon atoms and 0 to 65 parts of at least one monomer selected from the group consisting of bicyclic alkyl (meth)acrylates and aromatic (meth)acrylates.

The preferred polar polymer is selected from polymers of ethylene acrylic acid, poly styrene-co-maleic acid, poly sodium styrene sulfonate and the like, as long as the polymer is chemically compatible with water based latex polymers and is sufficiently ionic or polar to affect the surface tension of water to prevent beading or dewetting when printing on the film with a water-based ink. The polar polymer is in water, whether dissolved or dispersed, and needs to be stable so that it can be delivered via water into the coating.

While a wide variety of water dispersible polymers and polar polymers may be used in the present invention, it is desirable that both of these components have a substantially similar pH, for compatibility purposes.

An optional first surfactant which functions to prevent the latex polymer from agglomerating, can be selected from groups such as anionic surfactants, nonionic surfactants and mixtures thereof. Specific examples are those whose molecular structure includes at least one hydrophobic moiety and at least one anionic group such as sulfates, sulfonates and the like.

It is intended that the film of the present invention be applied to a substrate, such as, for example, a polyethylene terephthalate film filled with $BaSO_4$ for use in label stock materials. The film is to be coated on at least one major surface of the substrate, but may also be applied to substrates that have a gloss side and a matte side, since the location of the printing is not a limitation in this invention. Water based inks, solvent based inks and UV cured inks all work well with the ink receptive coating of this invention.

BRIEF DESCRIPTION OF THE DRAWINGS

For a more complete understanding of the invention, reference is hereby made to the drawings, in which:

THE FIGURE is a schematic, sectioned view of the film of the present invention on a substrate.

DETAILED DESCRIPTION OF THE PREFERRED EMBODIMENT

Figure 1:
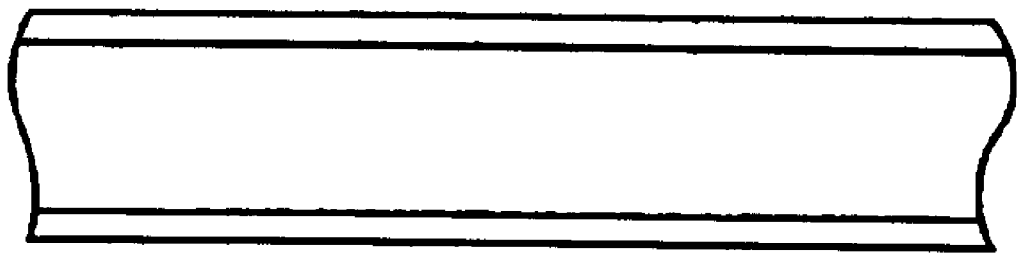

Synthetic polymer latices consist of microscopic or sub-microscopic polymer spheres colloidally suspended in water. These dispersions are milky, opaque and fluid, even at high solids contents. Upon drying, some latices form transparent, tough, continuous films, while others may form friable and discontinuous films. In liquid latex, particles move about by Brownian motion. As water evaporates, movement becomes more restricted. The water-air interfacial tension forces particles into packed arrays.

Further drying ruptures the stabilizing layers and polymer-polymer contact occurs and polymer-water interfacial tension becomes the driving force. The mechanism of film formation involves three phases: (1) evaporation of water or drying; (2) coalescence and deformation of latex particles; and (3) cohesive strength development by the further gradual coalescence of adjacent latices and the interdiffusion of polymer chains from adjacent particles.

Composite latices have been seen as a source of enhanced mechanical strength of the film as formed. Core/shell polymers have been used for many years with success in applications, such as those in the patents identified above. The preferred latex of the present invention is a core/shell latex polymer, wherein the ratio of the core to shell ranges from about 10/90 to 90/10, preferably from about 25/75 to about 50/50. The core polymer has a lower $T_g$ than the shell. The $T_g$ of the core preferably ranges from about −60° C. to about 20° C., and more preferably from about −20° C. to about 5° C. The $T_g$ of the shell ranges from about 35° C. to about 100° C., and more preferably from about 40° C. to about 90° C. When the $T_g$ of the shell gets below about 35° C., the composition becomes too soft and has blocking problems, particularly in high temperature and/or high humidity. A typical symptom of blocking problems is difficulty in separating adjacent sheets of coated material. On the other hand, when $T_g$ is above 100° C., ink adhesion may be less than desired.

The presence of the core appears to allow the use of a shell having a higher $T_g$ than normally possible without significant loss of ink adhesion, even though only the shell material actually is contacted by the ink. It is believed that the lower $T_g$ core material allows the overall latex emulsion in the dried film state to perform as a high impact resistant composite and is capable of absorbing applied stresses. This effect can be readily measured using an Instron testing device. The core/shell latex material has a percentage elongation at break of 120, while a material made up of only the shell portion has a percentage elongation at break of 13.

In the present invention, it is believed that more compliant core/shell layers allow the ink to come into contact with more surface area of the layer, while the lower $T_g$ of the core material aids a faster softening of the film and the high $T_g$ of the shell permits contact with a variety of printing devices.

The latex core is made from about 60 to 100 parts and preferably from about 75 to 90 parts of at least one α,β-ethylenically unsaturated monomer having from about 1 to about 12 carbon atoms. Where this monomer comprises less than 100% of the core, the core may contain up to about 40 parts of at least one monomer selected from the group consisting of bicyclic alkyl (meth)acrylates and aromatic (meth)acrylates.

The shell is likewise formed from 35 to 100 parts and preferably about 45 to 80 parts of at least one α,β-ethylenically unsaturated monomer having from about 1 to about 12 carbon atoms. Again, when this monomer is less than 100 parts, the shell also includes up to 65 parts, preferably from about 20 parts to 55 parts, of at least one monomer selected from the group consisting of bicyclic alkyl (meth)acrylates and aromatic (meth)acrylates.

Useful α,β-ethylenically unsaturated monomers include, but are not limited to, methyl acrylate, ethyl acrylate, methyl (meth)acrylate, isobutyl (meth)acrylate, isodecyl (meth)acrylate, cyclohexyl (meth)acrylate, n-butyl acrylate, styrene, vinyl esters, and the like. Preferred monomers include methyl (meth)acrylate, ethyl (meth)acrylate and isodecyl (meth)acrylate.

Useful bicyclic (meth)acrylates include, but are not limited to, dicyclopentenyl (meth)acrylate, norbornyl (meth)acrylate, and isobornyl (meth)acrylate. Preferred bicyclic monomers include isobornyl (meth)acrylate. Useful aromatic (meth)acrylates include, but are not limited to benzyl (meth)acrylate.

The core polymer, and/or the shell polymer can also contain from 0 to 20 parts of a polar monomer selected from the group consisting of (meth)acrylic acid or hydroxyalkyl (meth)acrylates; and nitrogen containing compounds including acrylamide, N-alkylacrylamide, N,N-dialkyl amino monoalkyl (meth)acrylate, N-alkyl amino alkyl (meth)acrylate, and their cationic salts, all said above alkyl groups having up to 8 carbon atoms, and preferably up to 2 carbon atoms.

Preferred polar monomers include acrylic acid, methacrylic acid, hydroxyethylacrylate and methacrylate, acrylamide, N-methylacrylamide, N-butylmethacrylamide, N-methylolacrylamide, N-butylaminoethyl(meth)acrylate, N,N'-diethylaminoethyl(meth)acrylate, N,N'-dimethyl aminoethyl-(meth)acrylate, N,N'-dimethyl amino ethyl (meth)acrylate, and isobutoxy (meth)acrylate.

When these polar monomers are present in the shell polymer, the shell polymer is optionally crosslinked. Some of the polar monomers, e.g., n-methylacrylamide and isobutoxy methacrylamide can undergo self-crosslinking during the drying stage, while other require an additional crosslinker to be present. Useful crosslinkers include polyfunctional aziridines such as trimethylolpropane-tris-(β-(N-aziridinyl)propionate), pentaerythritol-tris-(β(N-aziridinyl)

propionate, trimethylolpropane-tris(β(N-methylaziridinyl) propionate, and the like; ureaformaldehyde, melamine formaldehyde, isocyanate, multifunctional ethoxy polymers, alkyldialkoxy silane, gamma-aminopropyl trimethoxysilane, vinyl triethoxy silane, vinyl tris(β-methoxy ethoxy)-silane, vinyl triacetoxy silane, gamma-methacryloxypropyltrimethoxy silane, gamma-(β-amino ethyl) aminopropyl trimethoxy silane and the like.

The core/shell latex polymers are polymerized using emulsion polymerization techniques that are well known in the art. Emulsion polymerization requires the presence of emulsifiers in the polymerization vessel. Useful emulsifiers include those selected from the group consisting of anionic surfactants, nonionic surfactants and mixtures thereof. Specific examples include those whose molecular structure includes at least one hydrophobic moiety selected from the group consisting of from about $C_6$- to about $C_{12}$-alkyl, alkylaryl, and/or alkenyl groups as well as at least one anionic group selected from the group consisting of sulfate, sulfonate, phosphate, polyoxyethylene sulfate, polyoxyethylene sulfonate, polyoxyethylene phosphate and the like, and the salts of such anionic groups, where said salts are selected from the group consisting of alkali metal salts, ammonium salts, tertiary amino salts, and the like.

Representative commercial examples of useful anionic surfactants include sodium lauryl sulfate, available from Stepan Chemical Co. as POLYSTEP™ B-3; sodium lauryl ether sulfate, available from Stepan Chemical as POLYSTEP™ B-12; and sodium dodecyl benzene sulfonate, available from Rhodia as RHODACAL™ DS-10.

Useful nonionic surfactants include those whose molecular structure comprises a condensation product of an organic aliphatic or alkyl aromatic hydrophobic moiety with the hydrophilic alkylene oxide such as ethylene oxide. The HLB (Hydrophilic-Lipophilic Balance) of useful nonionic surfactants is about 10 or greater, preferably from about 10 to about 20. The HLB of a surfactant is an expression of the balance of the size and strength of the hydrophilic (water-loving or polar) groups and the lipophilic (oil-loving or non-polar) groups of the surfactant. Commercial examples of nonionic surfactants useful in the present invention include nonylphenoxy or octylphenoxy poly)(ethyleneoxy) ethanols available from Rhone-Poulenc as the IGEPAL™ CA or CO series, respectively; octylphenoxypolyethoxyethanols such as TRITON™ X-100 or X-405 available from Union Carbide, $C_{11}$–$C_{15}$-secondary-alcohol ethoxylates available from Union Carbide as the TERGITOL™ 15-S series; and polyoxyethylene sorbitan fatty acid esters available from ICI Chemicals as the TWEEN™ series of surfactants.

Most preferably, the emulsion polymerization of this invention is carried out in the presence of a mixture of anionic surfactant(s) and nonionic surfactant(s), wherein the ration of anionic:nonionic surfactants is from about 10:90 to about 90:10. A useful range of emulsifier is from about 1% to about 8% by weight, preferably from about 1.5% to about 7% by weight, and most preferably from about 2% to about 5% by weight, based on the total weight of all monomers in both the core and the shell of the latex polymer.

Water soluble thermal initiators are also present in the emulsion polymerization of core/shell latex polymers. Suitable ones include those selected from the group consisting of potassium persulfate, ammonium persulfate, sodium persulfate, and mixtures thereof; and oxidation-reduction initiators such as the reaction product of the above mentioned persulfates and reducing agents such as those selected from the group consisting of sodium metabisulfite and sodium bisulfite. The preferred water soluble thermal initiators are potassium persulfate and ammonium persulfate.

Preferably most water soluble initiators are used at a temperature of from about 50° to about 70° C., while the oxidation-reduction initiators are preferably used at temperatures from about 25° C. to about 50° C. Water soluble thermal initiators comprise from about 0.05 to about 2 parts, preferably about 0.1 to about 0.5 parts, based on the total weight of monomers in the emulsion.

As an alternative to the emulsion polymer latex in the film of the invention, an aqueous dispersion or suspension of polymer particles may be used. Sulfonated polyesters, and polyurethanes, are exemplary of polymers which may be obtained as suspensions or dispersions in water.

A polar component of the inventive film is required to impart printability by water-based inks. Some water dispersible polymers include a polar component. Those that do not will require a polar polymer as a component of the film of this invention. The polar polymer may be ionic or ionizable, or simply polar in character. Exemplary polar polymers include, but are not limited to, polystyrene sulfonate, poly (styrene-alt-maleic acid) sodium salt, poly(sodium 4-styrene sulfonate), and ethylene/acrylic acid copolymer. The polar polymer may be present in the dried film at levels of from about 0.01% to about 10% by weight. Preferably this range should be from about 0.04% to about 4%. If too little of the polar polymer is present in the dried film, water-based inks will bead up or dewet when printed upon the film, or will fail to adhere to the film. If none of the polar polymer is present, printability of water-based ink does not occur. If too much of the polar polymer is present, on a dry-weight basis, in the coating formulation for the film, film formation upon coating and drying will be impaired, leading to cracking of the film and/or poor adhesion to the substrate. The high end of this range will depend on the kind of latex or water-dispersible polymer and the concentrations of components.

In any event, the resulting formed film will have a polar component once the film is dried in order to impart good water-based ink receptivity. While a wide variety of water dispersible polymers and polar polymers may be used in the present invention, it is preferred that both of these components have substantially the same pH, for compatibility purposes. Accordingly when practicing the invention, care should be used in taking a water dispersible polymer, listed above, and a polar polymer, also listed above, so that the pH differences, if any, are not large. Preferred is for a difference in pH between the two polymers of less than 7 and preferably less than 3.

An antistatic agent may also be present in the coating. Useful agents are selected from the group consisting of nonionic antistatic agents, cationic agents, anionic agents and fluorinated agents. Useful agents include those available under the trade name ATMER™, such as 110, 1002, 1003, 1006 and the like, as well as derivatives of Jeffamine™ ED-4000, 900, 2000, Larostat™ 60A, and Markastat™ AL-14, available from Mazer Chemical Co., and Vanadium Pentoxide, with the preferred antistatic agents being steramido-propyldimethyl-β-hydroxy-ethyl ammonium nitrate, available as Cyastat™ SN, N,N'-bis(2-hydroxyethyl)-N-(3'-dodecyloxy-2'-hydroxylpropyl) methylammonium methylsulfate, available as Cyastat™ 609, both from Cytec Industries. The antistatic agent should be present in amounts up to 20% (solids/solids). Preferred amounts vary, depending on coating weight, but when higher coating weights are used, 1–10% is preferred, and when lower coating weights are used, 5–15% is preferred.

A polymeric antistat can also be used. One exemplary polymeric antistat is 3,4-polyethylenedioxythiophene. A compound of 3,4-polyethylenedioxythiophene and polystyrene sulfonate in water is available under the tradename Baytron P™, from Bayer Corp. Thus, Baytron P™ may be successfully employed as both the polar polymer component and the optional antistat component of the film.

If desired, additional emulsifiers can also be present in the coating solutions. The emulsifiers include nonionic or anionic emulsifiers and mixtures thereof, with nonionic emulsifiers being preferred. Suitable emulsifiers include those having a HLB of at least 10, preferably from 12 to 18. Useful nonionic emulsifiers include $C_{11}$–$C_{18}$ polyethylene oxide ethanol, such as TERGITOL™, especially those designated series "S" from Union Carbide Corp., those available as TRITON™ from Rohm and Haas Co., and the TWEEN™ series available from ICI America. Useful anionic emulsifiers include sodium salts of alkyl sulfates, alkyl sulfonates, alkyl ether sulfates, oleate sulfates, alkylarylether sulfates, alkylaryl polyether sulfates, and the like. Commercially available examples include those available under the trade names SIPONATE™ and SIPONIC™ from Alcolac, Inc., and RHODACAL™ from Rhodia. When used, the emulsifier is present at levels from about 1% to 7%, based on polymer, and preferably from 2% to 5%.

A second surfactant, or additional wetting agents with HLB values of 7–10 may be present in the coating formulation for the film to improve coatability. These additional surfactants are added after polymerization is complete, prior to coating of the substrate.

Preferred additional wetting agents include fluorochemical surfactants such as:

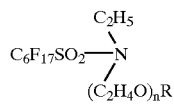

wherein n is from 6 to 15 and R can be hydrogen or methyl. One useful second surfactant is SURFYNOL 420™ from Air Products & Chemicals, which is believed to be a mixture containing ethoxylated acetylenic diols. Another useful wetting agent is TRITON™ X-100, available from Union Carbide. If the total amount of emulsifiers, wetting agents, and other surfactants in the final dry coating is less than 1% by weight, the gloss of the film may be adversely affected.

On the other hand, use of a water-dispersed sulfopolyester in place of a latex polymer as the water-dispersible film-forming polymer of the film tends to enhance the gloss at some amount of trade-off to the ink receptability.

Addition of a coalescing agent is also preferred for emulsion based layers to ensure that the coated material coalesces to form a continuous and integral layer and will not flake in conventional printing processes. Compatible coalescing agents include propylcarbitol, available from Union Carbide as the CARBITOL™ series, as well as the CELLUSOLVE™ series, PROPASOLVE™ series, EKTASOLVE™ series of coalescing agents, also from Union Carbide. Other useful agents include the acetate series from Eastman Chemicals, Inc. the DOWANOL™ E, series, DOWANOL™ E acetate series, DOWANOL™ PM series and their acetate series from Dow Chemical, N-methyl-2-pyrrolidone (NMP) from GAF, Inc. 3-hydroxy-2,2,4-trimethyl pentyl isobutyrate, available from Eastman Chemicals Inc. These coalescing agents can be used singly or as a mixture. Most coalescing agents evaporate during the drying of the film. For instance, in most cases only traces of NMP will remain in the final dried film when it is the chosen coalescing agent. Such evaporating coalescing agents may be used at levels of up to about 4% by total wet weight in the coating formulation.

One optional ingredient in the emulsion polymerized embodiment of the invention is an additional adhesion promoter to enhance durability of thicker coatings to the substrate. Useful adhesion promoters include organofunctional silane having the following general formula:

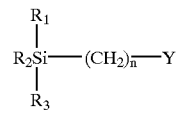

wherein $R_1$, $R_2$, and $R_3$ are selected from the group consisting of an alkoxy group and an alkyl group with the proviso that at least one alkoxy group is present, n is an integer from 0 to 4, and Y is an organofunctional group selected from the group consisting of chloro, methacryloxy, amino, glycidoxy and mercapto. Useful silane coupling agents include those such as γ-aminopropyl trimethoxysilane, vinyl triethoxy silane, vinyl tris(β-methoxy ethoxy)-silane, vinyl triacetoxy silane, γ-methacryloxypropyltrimethyloxy silane, γ-(β-amino ethyl) aminopropyl trimethoxysilane and the like. The adhesion promoter may be present at levels of from about 0.5% to 15% of the total resin, and preferably from 4% to 10%.

Fine particulate matter, either organic or inorganic, may be added to the coating formulation for the film when the film is meant to be the matte side of a two-sided construction. Thus, a substrate may be coated on both sides with films which differ substantially only in the presence, or the loading level, of particulate matter, to provide a two-sided universally-printable film-coated substrate having a gloss side and a matte side. Fine polymeric particles and fine mineral particles are preferred particulate matter components. Polymer particles may typically be used at levels of up to about 30% by weight of the final dried film. Mineral particles, which are more dense, may typically be used at levels of up to about 10% by weight of the final dried film.

As can be appreciated, the film of this invention is formed from a formulation in which the largest component is water. It has been found that the present invention forms the best films when the starting solids content is less than about 20%, and so the water content is at least about 80%. Preferably the solids content is between about 3% and 10%, and most preferred is about 7% solids, with the balance being water.

Various formulations of water based latex polymers were prepared and coated on various stocks to determine the receptivity of the coated stock to water based inks, solvent based inks and UV cured inks. Following are examples of these experiments.

EXAMPLE I

A latex formulation was prepared according to the following Table I for use as ink receptive coating A.

TABLE I

| component | % solids | grams | % by weight |
|---|---|---|---|
| DI water | 0 | 1715 | 85.75 |
| core/shell latex[a] | 34 | 206.5 | 10.23 |
| n-Methyl Pyrrolidone | 0 | 5.0 | 0.25 |
| Rhodacal DS-10[b] | 10 | 3.0 | 0.15 |
| Baytron P[c] | 1 | 71.0 | 3.55 |
| Surfynol S-420[d] | 10 | 6.0 | 0.30 |

[a] an ethyl acrylate - isobornyl acrylate core with a methyl methacrylate - isobornyl acrylate - ethyl acrylate shell
[b] sodium dodecylbenzenesulfonate (Rhodia)
[c] 3,4-polyethyendioxythiophene-polystyrenesulfonate (Bayer)
[d] a mixture containing ethoxylated acetylenic diols

EXAMPLE II

A latex formulation was prepared according to the following Table II for use as an ink receptive coating B.

TABLE II

| component | % solids | grams | % by weight |
|---|---|---|---|
| DI water | 0 | 1715 | 85.75 |
| core/shell latex[a] | 34 | 206.5 | 10.23 |
| n-Methyl Pyrrolidone | 0 | 5.0 | 0.25 |
| Rhodacal DS-10[b] | 10 | 3.0 | 0.15 |
| polar polymer #1 | 30 | 2.4 | 0.12 |
| Surfynol S-420[d] | 10 | 6.0 | 0.30 |

[a] an ethyl acrylate - isobornyl acrylate core with a methyl methacrylate - isobornyl acrylate - ethyl acrylate shell
[b] sodium dodecylbenzenesulfonate (Rhodia)
1 poly(styrene-alt-maleic acid) sodium salt (Aldrich)
[d] a mixture containing ethoxylated acetylenic diols

EXAMPLE III

A latex formulation was prepared according to the following Table III for use as an ink receptive coating C.

TABLE III

| component | % solids | grams | % by weight |
|---|---|---|---|
| DI water | 0 | 1715 | 85.75 |
| core/shell latex[a] | 34 | 206.5 | 10.23 |
| n-Methyl Pyrrolidone | 0 | 5.0 | 0.25 |
| Rhodacal DS-10[b] | 10 | 3.0 | 0.15 |
| polar polymer #2 | 100 | 0.7 | 0.04 |
| Surfynol S-420[d] | 10 | 6.0 | 0.30 |

[a] an ethyl acrylate - isobornyl acrylate core with a methyl methacrylate - isobornyl acrylate - ethyl acrylate shell
[b] sodium dodecylbenzenesulfonate (Rhodia)
2 poly(sodium 4-styrene sulfonate) (Aldrich)
[d] a mixture containing ethoxylated acetylenic diols

EXAMPLE IV

A latex formulation was prepared according to the following Table IV for use as an ink receptive coating D.

TABLE IV

| component | % solids | grams | % by weight |
|---|---|---|---|
| DI water | 0 | 1715 | 85.75 |
| core/shell latex[a] | 34 | 206.5 | 10.23 |
| n-Methyl Pyrrolidone | 0 | 5.0 | 0.25 |
| Rhodacal DS-10[b] | 10 | 3.0 | 0.15 |
| polar polymer #3 | 30 | 2.4 | 0.12 |
| Surfynol S-420[d] | 10 | 6.0 | 0.30 |

[a] an ethyl acrylate - isobornyl acrylate core with a methyl methacrylate - isobornyl acrylate - ethyl acrylate shell
[b] sodium dodecylbenzenesulfonate (Rhodia)
3 ethylene acrylic acid copolymer (Michem Prime 4983R ™ from Michelman Inc.)
[d] a mixture containing ethoxylated acetylenic diols

EXAMPLE V

A latex formulation was prepared according to the following Table V for use as ink receptive coating E.

TABLE V

| component | % solids | grams | % by weight |
|---|---|---|---|
| DI water | 0 | 1784 | 89.24 |
| core/shell latex[a] | 34 | 206.5 | 10.33 |
| n-Methyl Pyrrolidone | 0 | 4.9 | 0.25 |
| Rhodacal DS-10[b] | 10 | 2.8 | 0.14 |
| Cyastat 609 | 50 | 0.92 | 0.05 |

[a] an ethyl acrylate - isobornyl acrylate core with a methyl methacrylate - isobornyl acrylate - ethyl acrylate shell
[b] sodium dodecylbenenesulfonate (Rhodia)

Samples of each of the above described coating materials were coated on white $BaSO_4$ filled polyethylene terephthalate label stock material and tested for ink reception. FIG. 1 illustrates an example of label stock 11, having a gloss side 13 and a matte side 15. Coatings 17 may be applied to either or both sides, in accordance with the present invention.

The ink receptivity of labelstocks is measured by using specific inks in each of three categories: 1) water based, 2) solvent based and 3) ultra-violet curable. The ink is deposited on the sample labelstock using a hand-held proofing instrument. The ink is appropriately cured, then evaluated visually for wet-out and evaluated for ink anchorage using a tape-snap test. The specific procedures are outlined below:

I. Evaluation of Ink Receptivity for Water-Based Inks

Two specific inks are used for this test, EM005451 Rubine Red and EP002015 Process Red available from Environmental Inks and Coatings, Addison, Ill. Experience has shown that these inks represent the performance of water-based inks in general.

The inks are deposited on the sample labelstock using a Pamarco "Proofmaster" precision hand proofer, utilizing a 180P cylinder. This hand proofer is available from Pamarco Midwest of Batavia, Ill. The deposited inks are air dried at room temperature for at least 10 minutes.

3M Scotch Brand #600 and #898 tapes 1 inch (2.54 cm.) wide, are adhered across the ink deposits and rolled with a 2.0 kg rubber roller. The tapes are removed by hand a) slowly pulling back at 180 degrees and b) rapidly pulling back at 180 degrees. The performance is rated on a scale of 1 to 10 based on the amount of ink removed (1=all ink removed, 10=no ink removed). The ink wet out is evaluated using a 30× hand held magnifying glass.

II. Evaluation of Ink Receptivity for Solvent-Based Inks

A single solvent based ink is used for this test, Gemglo 3M Red (SPA41311F/S) available from Sun Chemical Corporation, Fort Lee, N.J. Experience has shown that this ink is representative of the performance of solvent based inks in general.

The ink is deposited on the sample labelstock using a Pamarco "Proofmaster" precision hand proofer, utilizing a 180P cylinder. This hand proofer is available from Pamarco Midwest of Batavia, Ill. The deposited ink is air dried at room temperature for at least 10 minutes.

3M Scotch Brand #600 and #898 tapes 1 inch (2.54 cm.) wide, are adhered across the ink deposit and rolled with a 2.0 kg rubber roller. The tapes are removed by hand a) slowly pulling back at 180 degrees and b) rapidly pulling back at 180 degrees. The performance is rated on a scale of 1 to 10 based on the amount of ink removed (1=all ink removed, 10=no ink removed). The ink wet out is evaluated using a 30× hand held magnifying glass.

III. Evaluation of Ink Receptivity for U.V. Curable Inks

Two specific inks are used for this test, UFA BW5 Warm Red and UFA BW8 Process Blue, available from Akzo Nobel Inks Corporation, Plymouth, Minn. Experience has shown that these inks represent the performance of U.V. curable inks in general.

The inks are deposited on the sample labelstock using a Cavanagh UV Flexo Proofer, Model C utilizing a 360P cylinder. This hand proofer is available from The Cavanagh Corporation, Flemington, N.J. The deposited inks are cured using Model LCU 750A U.V. Laboratory Curing Oven manufactured by ILC Technology, Sunnyvale, Calif.

3M Scotch Brand #600 and #898 tapes 1 inch (2.54 cm.) wide are adhered across the ink deposit and rolled with a 2.0 kg rubber roller. The tapes are removed by hand a) slowly pulling back at 180 degrees and b) rapidly pulling back at 180 degrees. The performance is rated on a scale of 1 to 10 based on the amount of ink removed (1=all ink removed, 10=no ink removed). The ink wet out is evaluated using a 30× hand held magnifying glass.

EXAMPLE VI

In addition to the five label stocks having films cast from the formulations of Examples I–V, a commercial label stock, 3M Brand Polyester Thermal Transfer Gloss White Label Stock #7816 was tested. #7816 is known to be an excellent label stock for solvent-based and UV-cured inks. Table VI shows the results of the ink receptivity tape tests for Examples I–VI.

TABLE VI

| Example | Tape Type | Water Based Ink Slow Peel | Water Based Ink Fast Peel | Solvent Based Ink Slow Peel | Solvent Based Ink Fast Peel | UV-Cured Ink Slow Peel | UV-Cured Ink Fast Peel |
|---|---|---|---|---|---|---|---|
| I | #898 | 10 | 10 | 10 | 10 | 10 | 10 |
| I | #600 | 10 | 10 | 10 | 9–10 | 10 | 10 |
| II | #898 | 10 | 10 | 10 | 10 | 10 | 10 |
| II | #600 | 10 | 10 | 10 | 8–10 | 10 | 10 |
| III | #898 | 10 | 10 | 10 | 10 | 10 | 10 |
| III | #600 | 10 | 10 | 10 | 8–10 | 10 | 10 |
| IV | #898 | 10 | 10 | 10 | 10 | 10 | 10 |
| IV | #600 | 10 | 10 | 10 | 8–10 | 10 | 10 |
| V | #898 | 10 | 7 | 10 | 10 | 10 | 10 |
| V | #600 | 10 | 7 | 10 | 8–10 | 10 | 10 |
| VI | #898 | 4 | 4 | 10 | 10 | 10 | 10 |
| VI | #600 | 1 | 1 | 10 | 8–10 | 10 | 10 |

TABLE VII

| Example No. | Film-Forming Polymer Type | Film-Forming Polymer % Solids | Film-Forming Polymer pH | Film-Forming Polymer g Used | Polar Polymer Type Used |
|---|---|---|---|---|---|
| VII | PVdC Latex[e] | 24 | 2 | 73.17 | Baytron |
| VIII | Urethane[f] | 33 | 8.3 | 53.22 | Michem |
| IX | Sulfonated PET[g] | 30 | | 58.54 | Baytron |
| X | Acrylate[h] | 42 | 7.2–7.9 | 41.81 | Michem |
| XI | Acrylate[i] | 44.5 | 2.1–4.0 | 39.46 | Baytron |
| XII | Urethane[j] | 35 | 7–9 | 50.17 | Michem |
| XIII | Urethane[k] | 35 | 5 | 50.17 | Baytron |
| XIV | EAA Copolymer[l] | 30 | 8.4–9.4 | 58.54 | Michem |

[e]a Polyvinylidene Chloride emulsion polymer prepared for this study
[f]NEOREZ ™ R-960 available from Neoresins Div. of Avecia, Inc.
[g]Eastman AQ ™ 29D Sulfopolyester dispersion available from Eastman Chemical Co.
[h]MAINCOTE ™ HG-54D Acrylic Emulsion available from Rohm and Haas
[i]RHOPLEX ™ HA-12 Acrylic Emulsion available from Rohm and Haas, believed to contain acrylamide and ethyl acrylate as main monomers.
[j]WITCOBOND ™ A-100 Urethane Colloidal dispersion available from CK Witco Corp., believed to contain an aliphatic polyester-based urethane and a polyacrylate.
[k]WITCOBOND ™ W-215 Cationic Urethane Dispersion available from CK Witco Corp.
[l]Michem Prime 4983R ™ EAA copolymer. Note that in Ex. XIV, Michem Prime 4983R ™ serves both as the film-forming water-dispersible polymer and as the polar polymer in the formulation.

EXAMPLES VII–XIV

In these Examples, the composition of the water-dispersible film-forming polymer was changed. In order to maintain coating formulation stability, the polar polymer used in each formulation was selected on the basis of pH. Baytron P™ has a pH of 1–2, whereas Michem Prime 4983R™ has a pH of 8.4–9.4. In all cases, 1.25 g of NMP, 0.75 g of Rhodacal™ DS-10, and 1.5 g of Surfynol™ 420 were used. DI Water was added to make up a total of 500 g of each formulation. Baytron P™, as received, contains 1% solids, while Michem Prime 4983R™ contains 30% solids, thus, Baytron P™ was added at a level of 25 g, while Michem Prime 4983R™ was added at a level of 0.83 g. Table VII lists the remaining details of each formulation.

All the formulations VII–XIV were coated onto white PET film as in the previous Examples, and the coated films were tested for ink adhesion by the tape test. All received scores of "10" for all inks tested, for both tape types and at both peel speeds, except for Ex. XIV, which received scores of "10" for all tests except the water-based ink, with the #898 tape, for which it received scores of "8".

EXAMPLE XV

To determine whether other polymers in addition to EAA copolymer might serve successfully both as film-forming water-dispersible polymer and as polar polymer, the formulation of Ex. XI was modified to omit a second polar polymer. Rhoplex™ HA-12 acrylic emulsion, having the polar monomer acrylamide, was mixed (14.8 g at 45% solids) with Triton™ X-100 (1 g at 10% solids) and DI water to make 100 g of coating formulation. The formulation was coated onto white PET substrate, and passed the ink adhesion tape tests.

EXAMPLE XVI

In order to determine whether polarity could be induced in an otherwise non-polar water-dispersible film-forming latex polymer, 19.6 g of the same core-shell latex used in Ex. I was blended with 1.0 g of 0.1N HCl and sufficient DI water to make 100 g of coating formulation. The formulation was coated onto white PET substrate, was printed with inks, and tested with the tape removal test. This formulation scored all "10"s except for an 8 for water-based inks with #600 tape at the fast peel rate, and a 9–10 for solvent based inks at the same test conditions, which was superior performance to Ex. V, having no polar polymer or HCl, but not quite as good as the performance of Ex. I.

As can be seen, the present invention is admirably suited for use as a coating film on materials on which printing is to be done, regardless of what ink is used. The coating of this invention is useful with synthetic substrates such as films, castings and the like, and can equally be used on paper, cardboard, and other cellulosic materials.

While particular embodiments of the present invention have been illustrated and described, it is not intended to limit the invention, except as defined by the following claims.

What is claimed is:

1. An ink-receptive film comprising a water-dispersible core/shell latex polymer in an amount sufficient to form a film, said core-shall latex polymer being stable as a water dispersion prior to forming said film; and a polar polymer in an amount sufficient to increase the receptivity of said film to printing with water-based ink when compared to the mains film without the polar polymer.

2. The film of claim 1, wherein said core/shell latex polymer comprises:

from about 65 to 100% by weight of a transparent film-forming core/shell latex polymer, wherein the ratio of core to shell ranges from about 10/90 to 90/10, with the core having a lower Tg than the shell;

said latex core/shell polymer having a care formed from about 60 to 100 parts of at least one $\alpha,\beta$-ethylenically unsaturated monomer having from about 1 to about 12 carbon atoms and 0 to 40 parts of at least one monomer selected from the group consisting of bicycle alkyl (meth)acrylates and aromatic (meth)acrylates;

said latex core/shell polymer having a shell formed from 35 to 100 parts of at least one $\alpha,\beta$-ethylenically unsaturated monomer having from about 1 to about 12 carbon atoms and 0 to 65 puts of at least one monomer selected from the group consisting of bicycle alkyl (meth)acrylates and aromatic (meth)acrylates.

3. The film of claim 2, wherein said core is at least 60 parts ethyl acrylate.

4. The film of claim 2, wherein said shell is at least 20 parts isobornyl acrylate.

5. The film of claim 2, wherein said shell comprises methyl methacrylate.

6. The film of claim 2, wherein said core is at least 60 parts ethyl acrylate and said shell is at least 20 parts isobornyl acetate.

* * * * *

UNITED STATES PATENT AND TRADEMARK OFFICE
CERTIFICATE OF CORRECTION

PATENT NO. : 6,926,957 B2
DATED : August 9, 2005
INVENTOR(S) : Engel, Michael R.

It is certified that error appears in the above-identified patent and that said Letters Patent is hereby corrected as shown below:

<u>Title page,</u>
Item [22], PCT Filed, delete "Jun. 28, 2001" and insert -- Jun. 29, 2001 --.

<u>Column 13,</u>
Line 27, delete "core-shall" and insert -- core-shell --.
Line 31, delete "mains" and insert -- same --.

<u>Column 14,</u>
Line 7, delete "Tg" and insert -- $T_g$ --.
Line 8, delete "care" and insert -- core --.
Lines 12 and 19, delete "bicycle" and insert -- bicyclic --.
Line 18, delete "puts" and insert -- parts --.

Signed and Sealed this

Sixth Day of June, 2006

JON W. DUDAS
*Director of the United States Patent and Trademark Office*